US012755756B1

(12) United States Patent
Chen et al.

(10) Patent No.: US 12,755,756 B1
(45) Date of Patent: Oct. 6, 2026

(54) WRITE HEAD DESIGNS WITH REFILL MATERIALS ON A BACK EDGE OF AN ASSIST DEVICE FOR IMPROVED WRITE HEAD RELIABILITY AND PERFORMANCE

(71) Applicant: Headway Technologies, Inc., Milpitas, CA (US)

(72) Inventors: Wenyu Chen, San Jose, CA (US); Shohei Kawasaki, Sunnyvale, CA (US); Yewhee Chye, Hayward, CA (US); Minghui Yu, Fremont, CA (US); Kazuki Sato, Sunnyvale, CA (US); Tetsuya Roppongi, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 19/357,567

(22) Filed: Oct. 14, 2025

(51) Int. Cl.
*G11B 5/31* (2006.01)
*G11B 5/11* (2006.01)
*G11B 5/187* (2006.01)
*G11B 5/48* (2006.01)
*G11B 5/00* (2006.01)

(52) U.S. Cl.
CPC ................ *G11B 5/315* (2013.01); *G11B 5/11* (2013.01); *G11B 5/187* (2013.01); *G11B 5/4866* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 6,785,092 | B2 | 8/2004 | Covington et al. | |
| 8,264,799 | B2 | 9/2012 | Akiyama et al. | |
| 9,064,534 | B1 * | 6/2015 | Zheng | G11B 5/3163 |
| 9,230,567 | B1 * | 1/2016 | Fujita | G11B 5/315 |
| 9,558,763 | B1 * | 1/2017 | Luo | G11B 5/1278 |
| 10,410,658 | B1 | 9/2019 | Liu et al. | |
| 11,056,134 | B1 * | 7/2021 | Eppler | G11B 5/1278 |
| 11,100,946 | B1 | 8/2021 | Le et al. | |
| 11,222,656 | B1 | 1/2022 | Le et al. | |
| 11,417,356 | B1 * | 8/2022 | Asif Bashir | G11B 5/187 |

(Continued)

OTHER PUBLICATIONS

Western Digital, "Energy-Assisted Magnetic Recording Technology for Higher HDD Capacities", Technical Brief, 6 pages, Oct. 2020.

(Continued)

*Primary Examiner* — Peter Vincent Agustin
(74) *Attorney, Agent, or Firm* — DLA Piper LLP (US)

(57) ABSTRACT

The present embodiments describe write head designs with structures adjacent to a back edge of an assist device. Refilled oxides with poor thermal conductivity can be changed to materials with better thermal conductivity to reduce temperature rise in the write head. For instance, a metal material can be disposed at a back edge of the assist device and adjacent to a side of the main pole. An insulator layer and/or an additional metal layer can be disposed between the assist device and the metal material. The designs can provide a better heat conductance that takes part of an undesirable Joule heat away from the assist device more efficiently so that the temperature rise inside and around the assist device becomes lower. The designs can also allow additional current into the assist device to maximize the assist of the assist device.

20 Claims, 8 Drawing Sheets

(56) References Cited

U.S. PATENT DOCUMENTS

| | | | | |
|---|---|---|---|---|
| 11,508,401 | B1 * | 11/2022 | Asif Bashir | G11B 5/3116 |
| 11,651,783 | B1 * | 5/2023 | Goncharov | G11B 5/3912 360/236.4 |
| 12,094,497 | B1 | 9/2024 | Sayed et al. | |
| 2005/0190479 | A1 * | 9/2005 | Terris | G11B 5/1278 |
| 2009/0262636 | A1 * | 10/2009 | Xue | G11B 5/314 369/126 |
| 2012/0257305 | A1 * | 10/2012 | Tang | G11B 5/3146 29/603.07 |
| 2018/0075868 | A1 | 3/2018 | Koui et al. | |
| 2023/0044051 | A1 * | 2/2023 | Lam | G11B 5/11 |
| 2024/0274152 | A1 * | 8/2024 | Hirata | G11B 5/11 |
| 2024/0296860 | A1 | 9/2024 | Liu et al. | |

OTHER PUBLICATIONS

Zhu, J. et al., “Microwave Assisted Magnetic Recording”, IEEE Transactions on Magnetics, vol. 44, No. 1, pp. 125-131, Jan. 2008.

* cited by examiner

WRITE HEAD DESIGNS WITH REFILL MATERIALS ON A BACK EDGE OF AN ASSIST DEVICE FOR IMPROVED WRITE HEAD RELIABILITY AND PERFORMANCE

TECHNICAL FIELD

Embodiments of the invention relate to the field of data storage devices. More particularly, embodiments of the invention relate to write head designs with metal materials and/or insulators disposed at a back edge of an assist device.

BACKGROUND

A magnetic recording medium (e.g., a magnetic disk) can store magnetic bits representing digital data. A magnetic writer can be part of a hard disk drive (HDD) to write digital data to the magnetic recording medium.

As data areal density in hard disk drives (HDD) writing increases, both write heads and media bits may be generally needed to be made smaller. However, with the decreasing sizes of the writers, their writability degrades. Some write head designs are configured to assist writing, and apart from the thermally assisted magnetic recording (TAMR) that has a completely different geometry from that of the perpendicular magnetic recording (PMR) without assist, there are three major categories that belong to the current assisted magnetic recording.

A first example category can use spin torque devices to generate high frequency field to help writing, such as microwave assisted magnetic recording (MAMR). A second example category can include using spin torque to reverse a layer in the device in order to guide the magnetic flux more concentrated from the main pole, such as spin torque reversal assisted magnetic recording (STRAMR). A third example category can include using a charge current to generate Oested fields for improving jitter of the writer.

SUMMARY

The present embodiments describe write head designs with structures adjacent to a back edge of an assist device. Refilled oxides with poor thermal conductivity can be changed to materials with better thermal conductivity to reduce temperature rise in the write head. For instance, a metal material can be disposed at a back edge of the assist device and adjacent to a side of the main pole. An insulator layer and/or an additional metal layer can be disposed between the assist device and the metal material. The designs can provide an improved heat conductance that takes part of an undesirable Joule heat away from the assist device more efficiently so that the temperature rise inside and around the assist device becomes lower. The designs can also allow additional current into the assist device to maximize the assist of the assist device.

In an example embodiment, a write head is provided. The write head can include a main pole and a trailing shield. The write head can also include an assist device disposed between the main pole and the trailing shield. The write head can also include an insulator layer disposed adjacent to a back edge of the assist device and a side of the main pole. The write head can also include a metal material disposed adjacent to the insulator layer and the trailing shield.

In some instances, a thickness of the insulator layer is less than a thickness of the metal material, wherein the thickness of the insulator layer ranges from 1-20 nanometers.

In some instances, the insulator layer comprises an oxide material comprising aluminum oxide, magnesium oxide, tantalum oxide, or silicon oxide, or a nitride material including silicon nitride or aluminum nitride.

In some instances, the write head also includes an additional metal layer disposed between the back edge of the assist device and the insulator layer.

In some instances, a thickness of the additional metal layer is less than a thickness of the metal material.

In some instances, the additional metal layer and the metal material comprises any of Ruthenium (Ru), Titanium (Ti), Tantalum (Ta), or an alloy including Nickel-Chromium (NiCr), and a multilayers of one or more of Ru, Ti, Ta, and NiCr.

In some instances, the back edge is disposed away from an air-bearing surface (ABS) of the write head.

In some instances, the assist device is etched via an etching process to remove part of the assist device at the back edge.

In some instances, the write head is part of a recording device in a head gimbal assembly, wherein the recording device is connected to a slider and a load beam, wherein the load beam is connected to a suspension configured to support the recording device and the slider.

In another example embodiment, a head gimbal assembly is provided. The head gimbal assembly can include a recording head including a slider and a device connected to the slider. The device can include a main pole and a trailing shield. The device can also include an assist device disposed between the main pole and the trailing shield. The device can also include a first metal layer disposed at a first side to a back edge of the assist device and a side of the main pole. The device can also include an insulator layer disposed adjacent to the second side of the first metal layer. The device can also include a metal material disposed adjacent to the insulator layer and the trailing shield. The head gimbal assembly can also include a load beam connected to the recording head. The head gimbal assembly can also include a suspension connected to the load beam and configured to support the recording head.

In some instances, a thickness of the insulator layer is less than a thickness of the metal material, wherein the thickness of the insulator layer ranges from 1-20 nanometers.

In some instances, the insulator layer comprises an oxide material comprising aluminum oxide, magnesium oxide, tantalum oxide, or silicon oxide, or a nitride material including silicon nitride or aluminum nitride.

In some instances, a thickness of the first metal layer is less than a thickness of the metal material.

In some instances, the first metal layer and the metal material comprises any of Ruthenium (Ru), Titanium (Ti), Tantalum (Ta), or an alloy including Nickel-Chromium (NiCr), and a multilayers of one or more of Ru, Ti, Ta, and NiCr.

In some instances, the back edge is disposed away from an air-bearing surface (ABS) of the write head.

In some instances, the assist device is etched via an etching process to remove part of the assist device at the back edge.

In another example embodiment, a method is provided. The method can include forming a main pole. The method can also include disposing an assist device in a gap formed between the main pole and the trailing shield. The method can also include disposing an insulator layer adjacent to a back end of the assist device and a side of the main pole. The method can also include disposing a metal material adjacent to the insulator layer and the trailing shield. The method can also include disposing a trailing shield adjacent to the main pole.

In some instances, the method includes performing an etching process to remove a portion of the assist device at the back edge of the assist device.

In some instances, the method includes disposing an additional metal layer between the back edge of the assist device and the insulator layer.

In some instances, the method includes providing the write head in a head gimbal assembly, wherein the write head is connected to a slider and a load beam, wherein the load beam is connected to a suspension configured to support the write head and the slider.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

A disk drive can include a write head to interact with a magnetic recording medium to read and write digital data to the magnetic recording medium. As the amount of digital data is required to be stored increases and with an increase in data aerial density of hard disk drive (HDD) writing, both the write head and digital data written to the magnetic recording medium can generally be made smaller.

As data areal density in hard disk drives (HDD) writing increases, both write heads and media bits may need to be made smaller. However, with the decreasing sizes of the writers, their writability can degrade. Various technologies are being developed to assist writing, and apart from thermally assisted magnetic recording (TAMR) that has a completely different geometry from that of perpendicular magnetic recording (PMR) without assist, there are three major categories relating to assisted magnetic recording. A first category uses spin torque devices to generate high frequency field to help writing, such as microwave assisted magnetic recording (MAMR). A second category uses spin torque to reverse a layer in the device in order to guide the magnetic flux more concentrated from the main pole, which can include spin torque reversal assisted magnetic recording (STRAMR). A third category can use a charge current to generate Oested fields for improving jitter of the writer.

Regardless of the category of write head design that is implemented, a cross-section view of the writer and assist device through the center of the main write pole (MP) can include oxides composed to refill the back edge of the assist device to restrict the current between the MP and the write shield in the trailing direction of the head movement (trailing shield, TS) within the assist device. These oxides can include aluminum oxide (AlOx), magnesium oxide (MgO), tantalum oxide (TaOx), silicon oxide (SiOx), etc.

Figure 1:
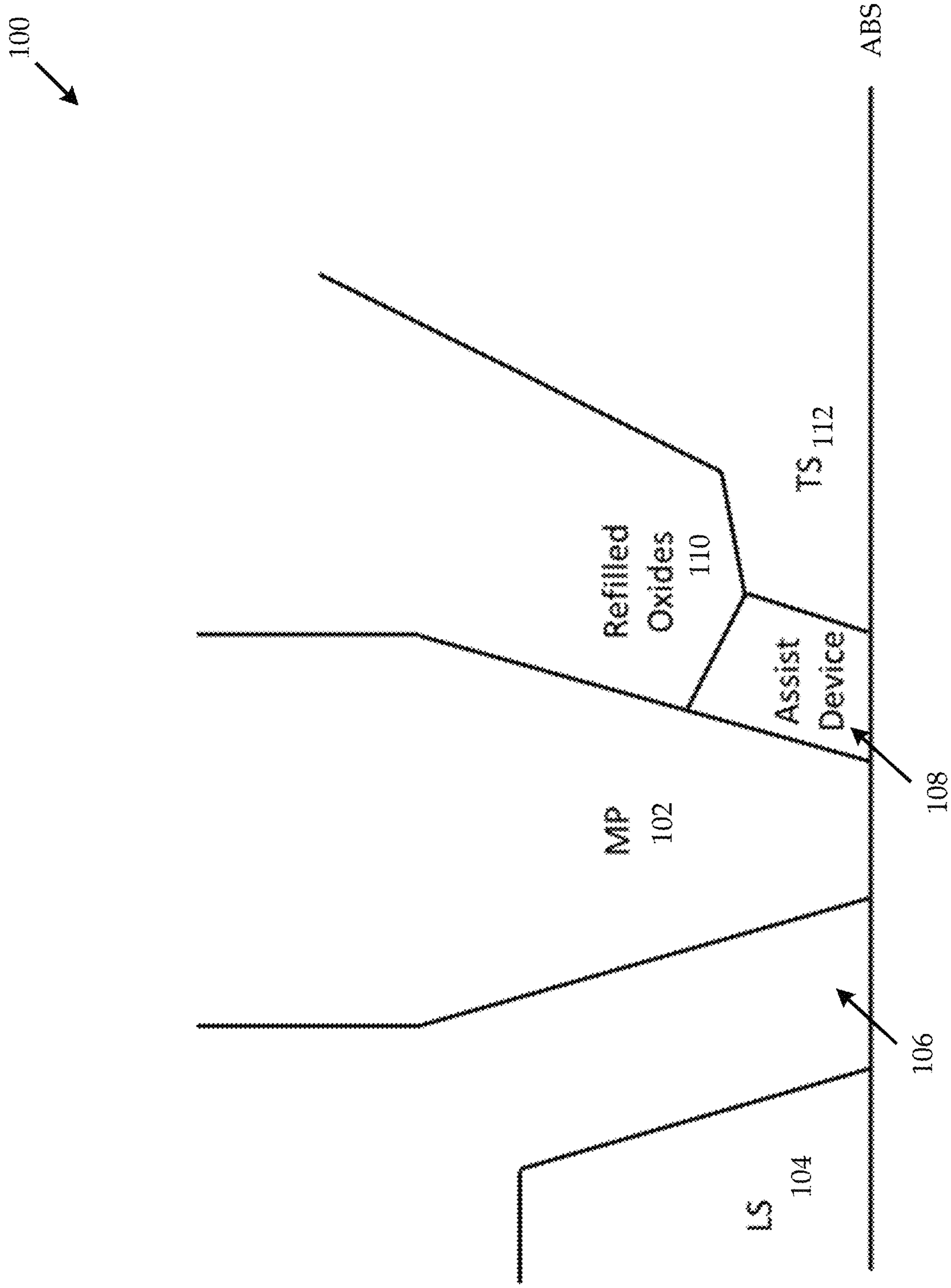
FIG. 1 is a cross-section view of an example write head with refilled oxides disposed adjacent to an assist device, in accordance with some embodiments.

FIG. 1 is a cross-section view of an example write head 100 with refilled oxides disposed adjacent to an assist device. As shown in FIG. 1, the write head 100 can include a MP 102 and a leading gap (LG) 104 disposed between the MP 102 and a leading shield (LS) 106. Further, the write head 100 can include an assist device 108 disposed between the MP 102 and a trailing shield (TS) 112. Refilled oxides 110 can be disposed on a back side of the assist device 108 away from an air-bearing surface (ABS). Refilled oxides 110 can further be disposed adjacent to the MP 102, TS 112, and assist device 108.

In the design described with respect to FIG. 1, local current density inside the device can be as high as several times $10^8$ A/cm$^2$ so that the local temperature rise can become tens to hundreds of degrees Celsius. As a result, the reliability can become poor, since such temperature rise leads to air-bearing-surface (ABS) oxidation, local corrosion, mechanical deformation, protrusion and erosion, and sometimes electrical migration may occur. In these cases, a lifetime of the assist device and surrounding regimes can be shorter than what is desirable for a hard disk drive (HDD) product. Within the reliability limit, the assist from the device can become limited.

The present embodiments describe write head designs with structures in the refill area on the back of the assist device. The refilled oxides with poor thermal conductivity can be changed to materials with better thermal conductivity to reduce temperature rise in the write head. The present embodiments can provide a design with an improved heat conductance that takes part of the undesirable Joule heat away from the assist device more efficiently so that the temperature rise inside and around the assist device becomes lower. The present embodiments can also provide a design that can allow additional current into the assist device to maximize the assist of the assist device.

The write head designs as described herein can improve thermal conductivity on a back edge of the assist device. As a result, under the same applied current in the assist device, heat generated by the current in the assist device can be well transmitted to the back, so that the temperature rise around the assist device becomes lower, and the device reliability is improved. Therefore, reliability problems such as air-bearing-surface (ABS) oxidation, local corrosion, mechanical deformation, protrusion, erosion, and electrical migration, can be improved or even avoided.

The write heads as described herein can enable additional current into the assist device under allowable temperature rise so that the assist can be maximized. Further, in some write head designs, a further additional charge current can be applied in a 1$^{st}$ metal layer to further enhance the charge current induced assist.

A first example write head structure is to replace insulator materials that can include oxides (e.g., refill oxides 110 in FIG. 1), with materials with an improved thermal conductivity. Such materials can include nitride materials such as Silicon Nitride (SiNx), Aluminum Nitride (AlNx), or mixtures of such materials, that can increase the thermal conductivity by several to several hundred times compared to that of oxides.

Another example write head structure can include replacing part of the refilled oxides to metals with higher thermal conductivity. However, metals generally include electrical conductors. In order to concentrate the electrical current within or around the assist device, still some insulators may be needed.

Figure 2:
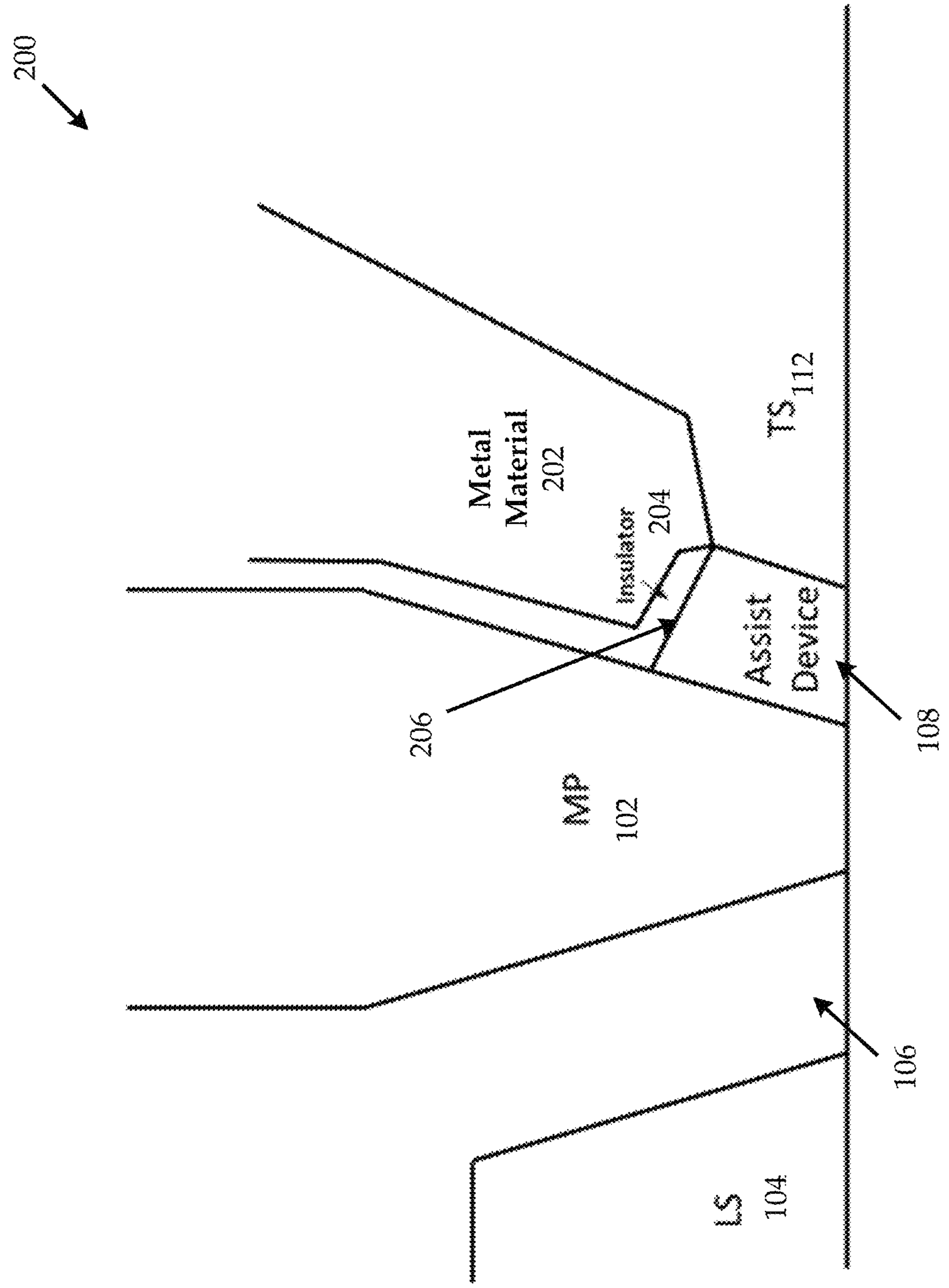
FIG. 2 illustrates an example write head with a metal material and an insulator layer disposed at a back edge of the assist device, in accordance with some embodiments.

A second example write head designs is shown with respect to FIG. 2. FIG. 2 illustrates an example write head 200 with a metal material 202 and an insulator layer 204 disposed at a back edge of assist device. As shown in FIG. 2, an insulator layer 204 can be disposed adjacent to assist device 108 and MP 102. The insulator layer 204 can have a thickness of several nanometers (nm) (e.g., ranging from 1-20 nm) in thickness. Further, the metal material 202 can include a refilled metal and can be disposed adjacent to the insulator layer 204 and the TS 112.

After a back edge IBE to the assist device, an insulator 204 can be deposited at the back end 206 of the assist device and on top of the exposed MP surface. The materials of this insulator can be oxides, nitrides, and/or combinations thereof. Further, non-magnetic metals can be deposited on top to fill the spacing between the MP and the TS. Possible choices of such non-magnetic metals can include any of Ruthenium (Ru), Titanium (Ti), Tantalum (Ta), or alloys such as Nickel-Chromium (NiCr), etc., and/or compounds of multilayers of such materials.

In some instances, alternating layers of metals with positive and negative mechanical stress can be applied in this deposition to avoid some process difficulties. The electrical current can flow between the MP and the TS via the assist device only, but the metal refill several nm away from the assist device can be used as a heat sink to prevent excessive temperature rise around and inside the assist device. This can improve the reliability of the device and can enable additional current in assist device to maximize the assist under the allowable temperature rise.

Figure 3:
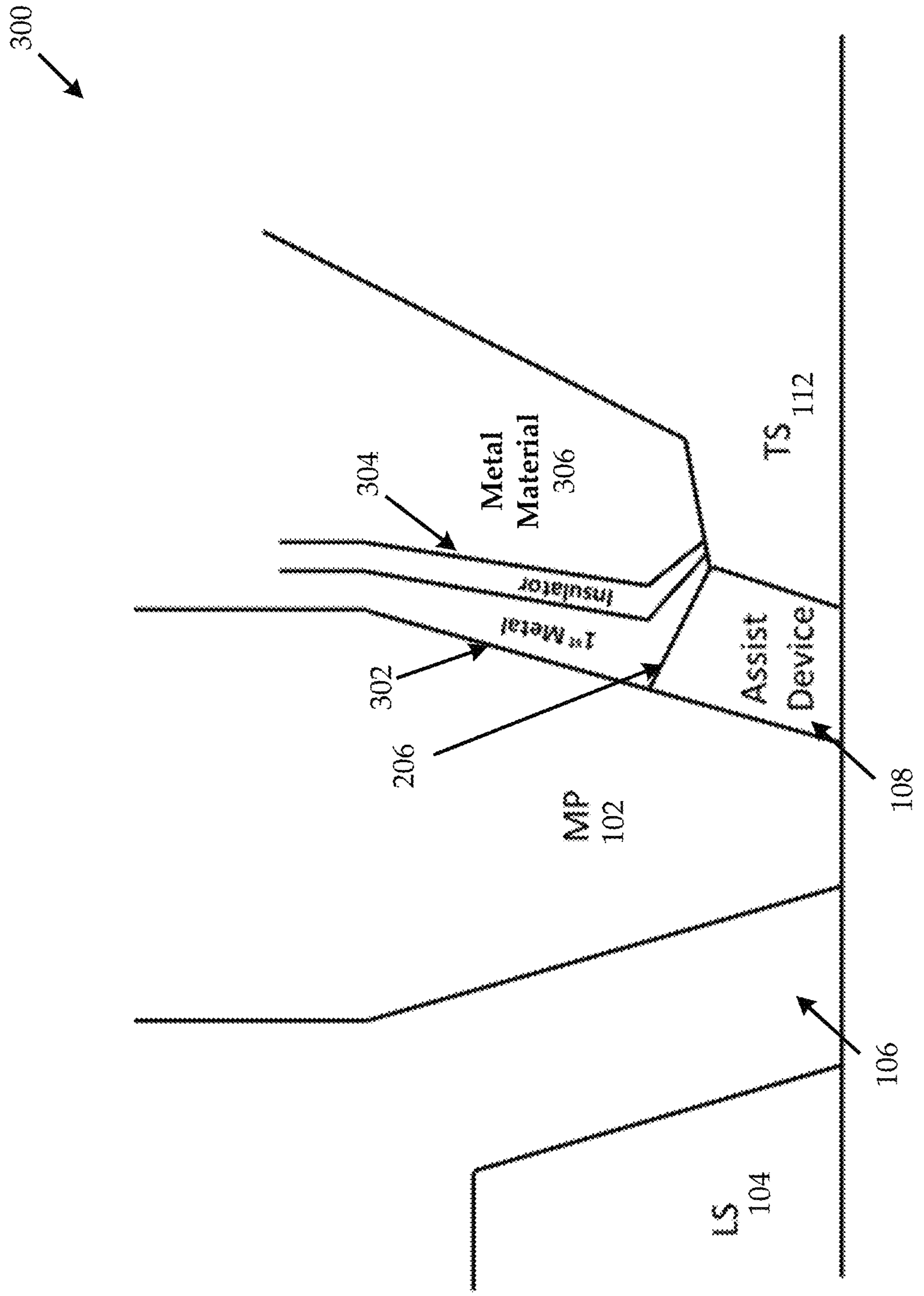
FIG. 3 is an example write head design with both a first metal layer and an insulator layer disposed between a MP and a metal material, in accordance with some embodiments.

FIG. 3 is an example write head design 300 with both a first metal layer 302 and an insulator layer 304 disposed between a MP 102 and a metal material 306. As shown in FIG. 3, the write head 300 can include a first metal layer 302 (or "additional metal layer") disposed at a back end 206 of the assist device 108 and disposed adjacent to the MP 102. An insulator layer 304 can be disposed adjacent to the first metal layer 302. The metal material 306 can be disposed adjacent to the insulator layer 304 and the TS 112.

After a back edge IBE to assist device 108, a first non-magnetic metal layer 302 can be deposited right next to the back end 206 of the assist device and on top of the exposed MP. The first non-magnetic metal layer 302 can include a non-magnetic metallic material, alloy, or multilayer as described herein.

Then, an insulator 304 several nm thick can be deposited on top of the first metal layer 302. The insulator 304 can be composed of oxides, nitrides, and/or a combination thereof. Then, metal material 306 can fill a remaining spacing adjacent to a TS 112. A thickness of the metal material 306 as described in FIG. 3 can be less than a thickness of metal material 202 as described in FIG. 2.

Both the first metal layer 302 and the metal material 306 on top can be composed of non-magnetic materials such as Ru, Ti, Ta, alloys such as NiCr etc., and/or compounds/multilayers of those materials. Compared to the second structure as described in FIG. 2, this design can further allow additional charge current in the $1^{st}$ metal layer to enhance the charge current induced assist.

In some instances, the assist device 108 as described herein can include any of: (a) spin torque devices to generate high frequency field to help writing (e.g., MAMR), (b) spin torque devices to reverse a layer in the device in order to guide the magnetic flux more concentrated from the main pole (e.g., STRAMR), and (c) a charge current to generate Oested fields for improving jitter of the writer. In some examples, the materials between the MP and the leading shield (LS)/side shield (SS) can be insulators, or conducting metals, where charge current can be applied between the MP and the LS and/or a side shield.

Figure 4:
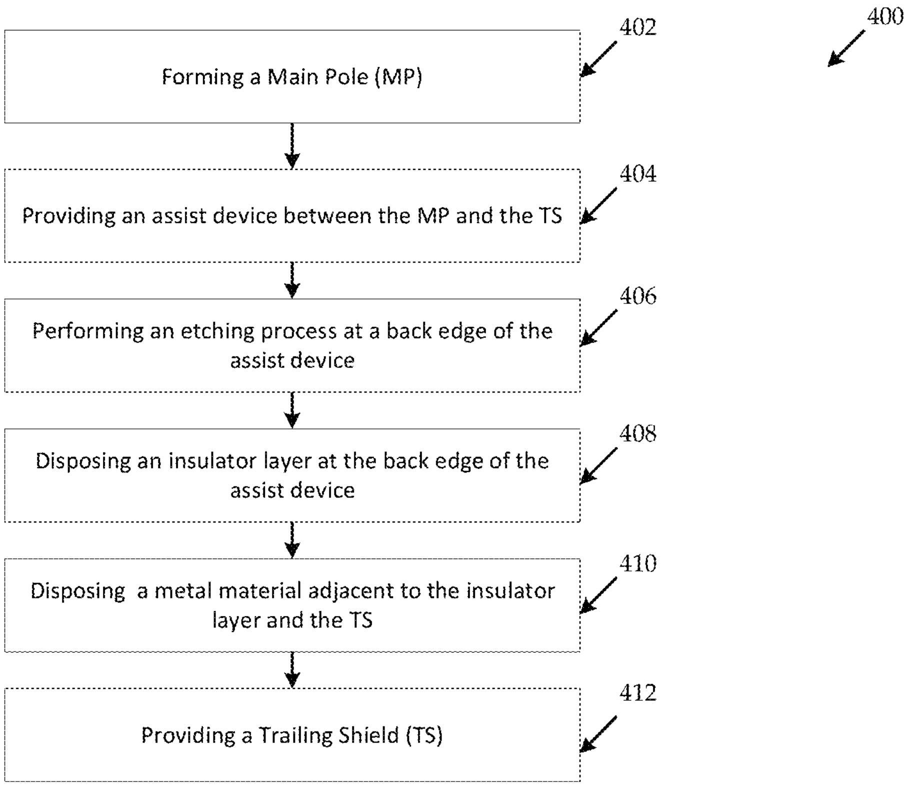
FIG. 4 is a first example flow process for manufacturing a write head as described herein.

In a first example, a process for manufacturing a write head with an insulator layer and a metal material disposed at a back edge of an assist device is provided. FIG. 4 is a first example flow process 400 for manufacturing a write head as described herein.

At 402, a main pole (e.g., 102) is formed. At 404, an assist device (e.g., 108) can be provided between the main pole and the trailing shield.

In some instances, the process can include forming a main pole with its top surface that can be disposed at a slope. Then, a full film assist device or write gap material can be disposed over the MP. Any of the disposing of material at the back edge of the assist device or side edges of the device can be performed.

At 406, an etching process can be performed at a back edge of the assist device. The etching process can remove a portion of the assist device at a back edge (e.g., an edge disposed away from the ABS).

At 408, an insulator layer (e.g., 204) can be disposed at the back edge of the assist device. At 410, a metal material (e.g., 202) can be disposed adjacent to the insulator layer and the trailing shield.

At 412, a trailing shield (e.g., 112) can be provided. The trailing shield can be disposed adjacent to the main pole, where a gap is formed between the main pole and the trailing shield.

Figure 5:
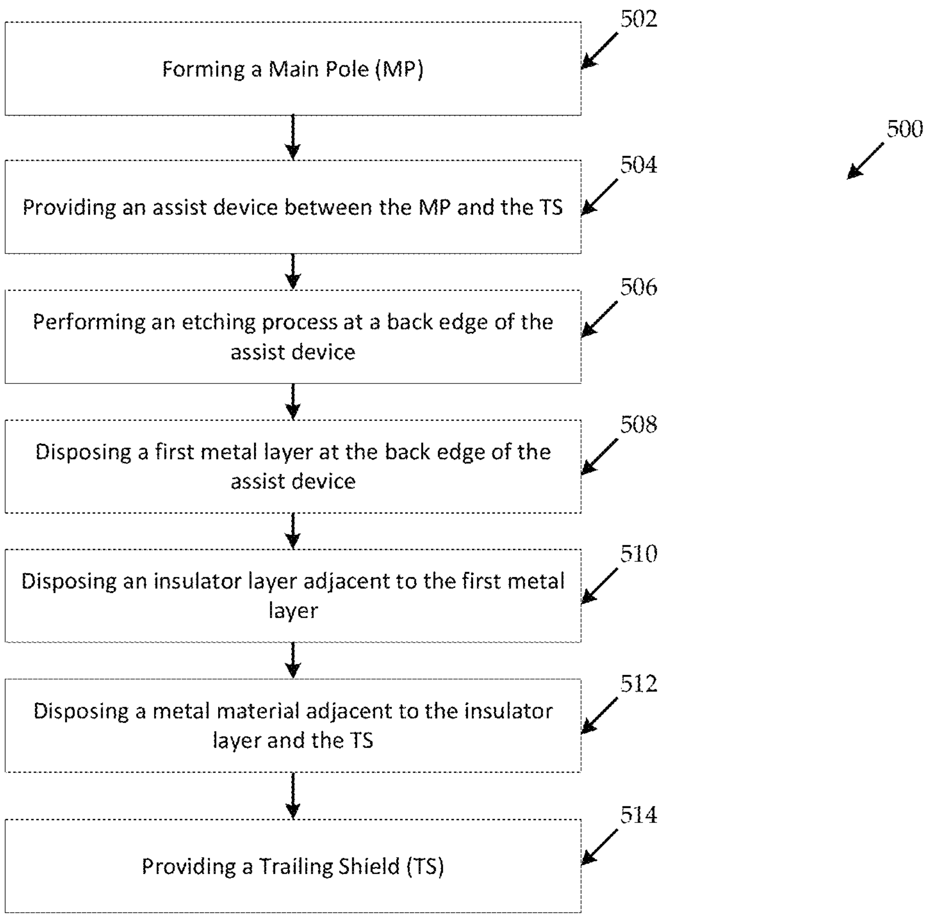
FIG. 5 is a first example flow process for manufacturing a write head as described herein.

In a second example, a process for manufacturing a write head with an additional metal layer, an insulator layer, and a metal material disposed at a back edge of an assist device is provided. FIG. 5 is a first example flow process 500 for manufacturing a write head as described herein.

At 502, a main pole (e.g., 102) is formed. At 504, an assist device (e.g., 108) can be provided between the main pole and the trailing shield. At 506, an etching process can be performed at a back edge of the assist device. The etching process can remove a portion of the assist device at a back edge (e.g., an edge disposed away from the ABS).

At 508, a first metal layer (e.g., 302) can be disposed at the back edge of the assist device and at a side of the main pole. At 510, an insulator layer (e.g., 304) can be disposed at the back edge of the assist device.

At 512, a metal material (e.g., 306) can be disposed adjacent to the insulator layer and the trailing shield. At 514, a trailing shield (e.g., 112) can be provided. The trailing shield can be disposed adjacent to the main pole, where a gap is formed between the main pole and the trailing shield.

In some examples, a write head design for spin and/or charge current induced assist in a HDD writer can include a magnetic main pole (MP) that provides a strong and concentrated field to write the medium bit. The write head can also include a trailing write shield (TS) that can be used to collect magnetic flux back to the writer.

The write head can also include an assist device located in the write gap between the MP and the TS, via which the current passes between the MP and the TS to utilize spin current and/or charge current to assist the write process. The assist device can be etched at the back edge, and materials can be filled between the exposed MP and the upper TS.

The gap between the MP and the leading shield (LS)/side shield (SS) can be either insulating materials, or conducting metals, where charge current can be applied between the MP and the LS/SS as well, in some instances. The write head can also include a current source to provide a DC and/or AC bias current from the TS to the MP through the said assist device.

In some instances, the refilled materials at the back edge can be changed to insulating materials with better thermal conductivity, such as nitrides.

In some instances, the refilled materials at the back edge can start with insulating layer(s) followed by non-magnetic metals.

In some instances, the refilled materials at the back edge can start with a $1^{st}$ metal layer, and then insulating layer(s) followed by non-magnetic metal(s).

In some instances, the insulating layer(s) can be single layer oxide, nitride, or else, or insulating compounds or multilayered insulators. Further, the $1^{st}$ metal and/or the non-magnetic metal(s) as described herein can be Ru, Ta, Ti, etc, alloys like NiCr, or compounds or multilayered metals.

In some instances, heat generated by the current in the assist device can be transmitted to the back under the same applied current in the assist device, so that the temperature rise around the assist device can become lower, and the device reliability can be improved. Hence, the reliability problems such as air-bearing-surface (ABS) oxidation, local corrosion, mechanical deformation, protrusion, erosion, and electrical migration, can thus be improved or avoided.

In some instances, an additional current into the assist device can be enabled under allowable temperature rise so that the assist can be maximized. In some instances, a further additional charge current can be applied in the $1^{st}$ metal layer to further enhance the charge current induced assist.

Figure 6:
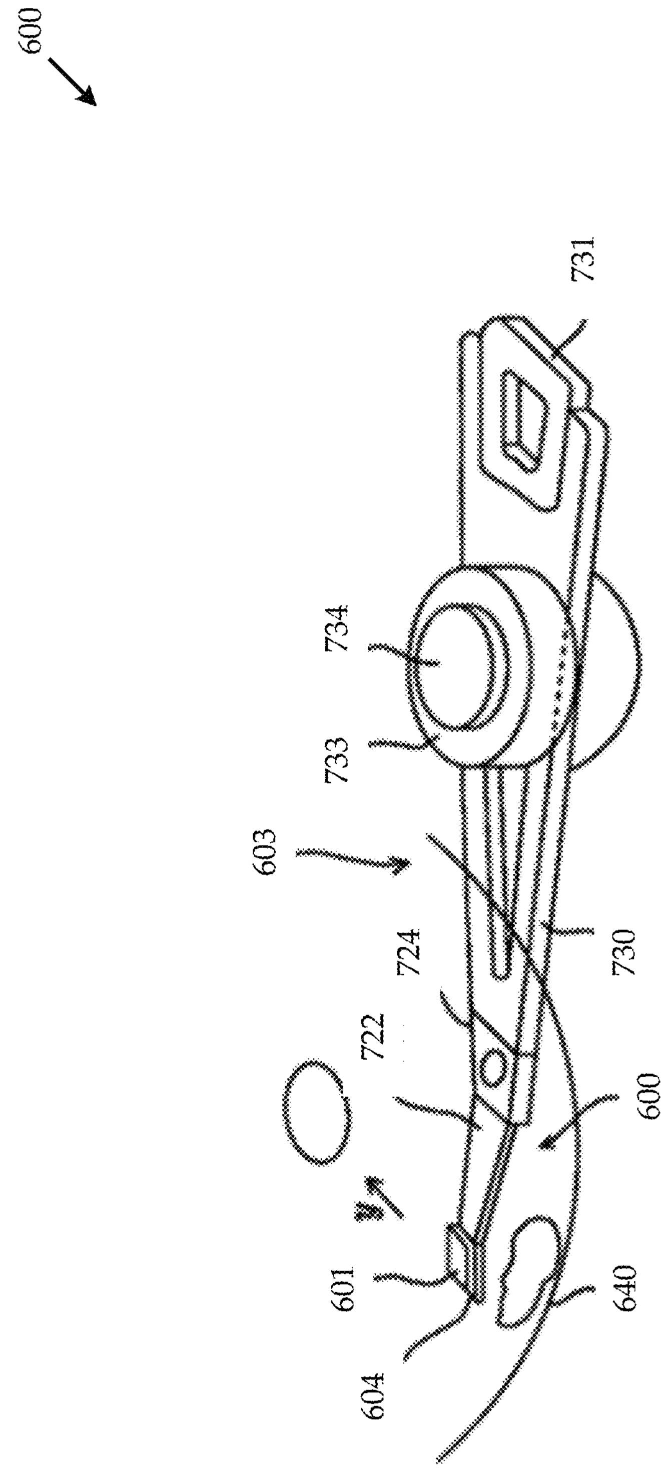
FIG. 6 is a perspective view of an example head gimbal assembly, according to some embodiments.
Figure 7:
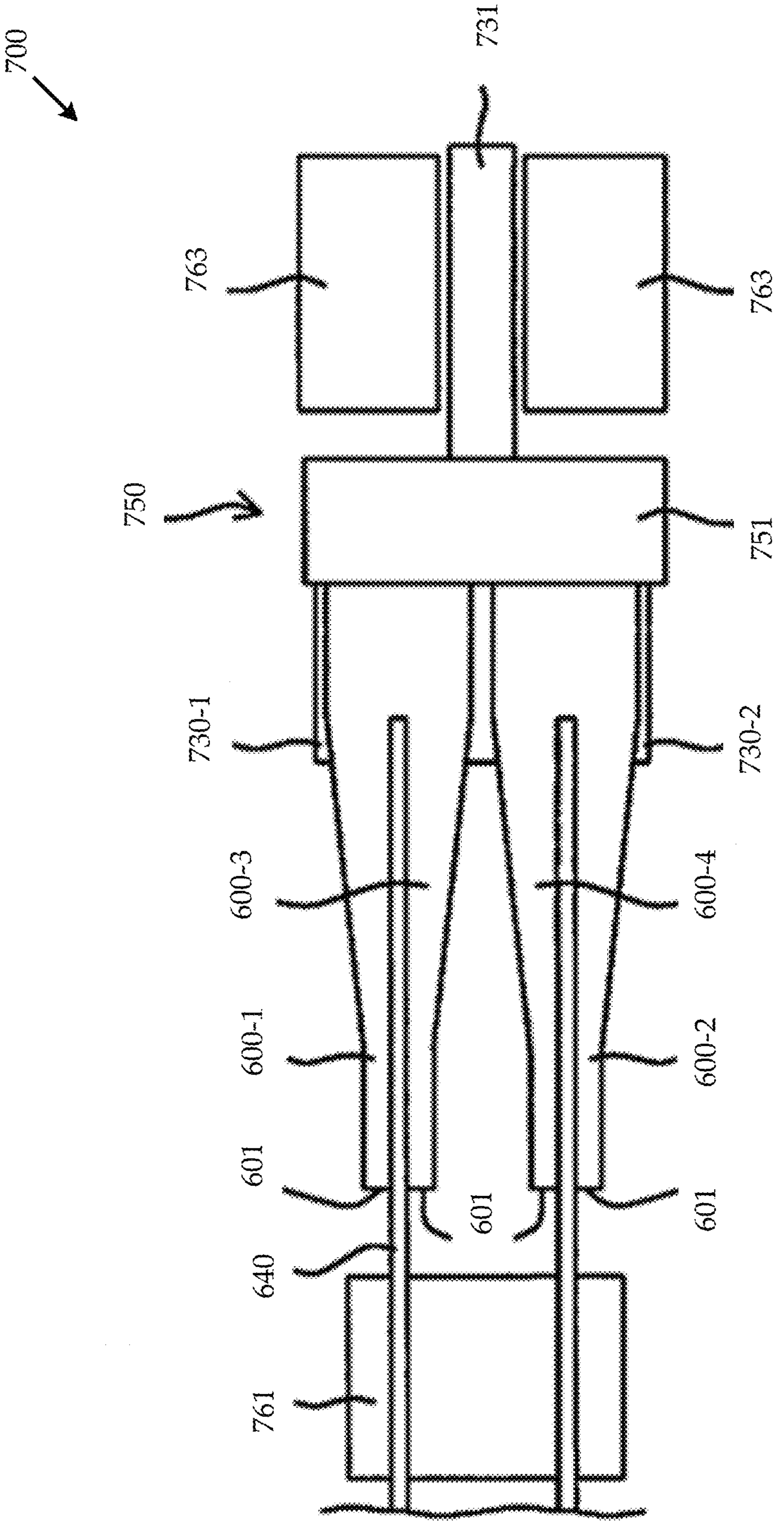
FIG. 7 is a side view of an example head stack assembly, according to some embodiments.

The head as described herein can be part of a hard disk drive (HDD) system. For instance, the head can include a slider and a write structure as described herein, with a suspension configured to support the head. FIG. 6 is a perspective view of an example head gimbal assembly 600, according to some embodiments of the present disclosure. The head and LD as described herein can be part of an assembly comprising components as described with respect to FIGS. 6-8.

Referring to FIG. 6, a head gimbal assembly (HGA) 600 includes a magnetic recording head 601 comprised of a slider and a writer structure formed thereon, and a suspension 603 that elastically supports the magnetic recording head. The suspension has a plate spring-like load beam 722 formed with stainless steel, a flexure 604 provided at one end portion of the load beam, and a base plate 724 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 600 is mounted on an arm 730 formed in the head gimbal assembly. The arm moves the magnetic recording head 601 in the cross-track direction y of the magnetic recording medium 640. One end of the arm is mounted on base plate 724. A coil 731 that is a portion of a voice coil motor is mounted on the other end of the arm. A bearing part 733 is provided in the intermediate portion of arm 730. The arm is rotatably supported using a shaft 734 mounted to the bearing part 733. The arm 730 and the voice coil motor that drives the arm configure an actuator.

Next, a side view 700 of a head stack assembly (FIG. 7) and a plan view 800 of a magnetic recording apparatus (FIG. 8) wherein the magnetic recording head 601 is incorporated are depicted. The head stack assembly 750 is a member to which a plurality of HGAs (HGA 600-1 and second HGA 600-2 are at outer positions while HGA 600-3 and HGA 600-4 are at inner positions) is mounted to arms 730-1, 730-2, respectively, on carriage 751. A HGA is mounted on each arm at intervals so as to be aligned in the perpendicular direction (orthogonal to magnetic medium 640). The coil portion (631 in FIG. 6) of the voice coil motor is mounted at the opposite side of each arm in carriage 751. The voice coil motor has a permanent magnet 763 arranged at an opposite position across the coil 731.

Figure 8:
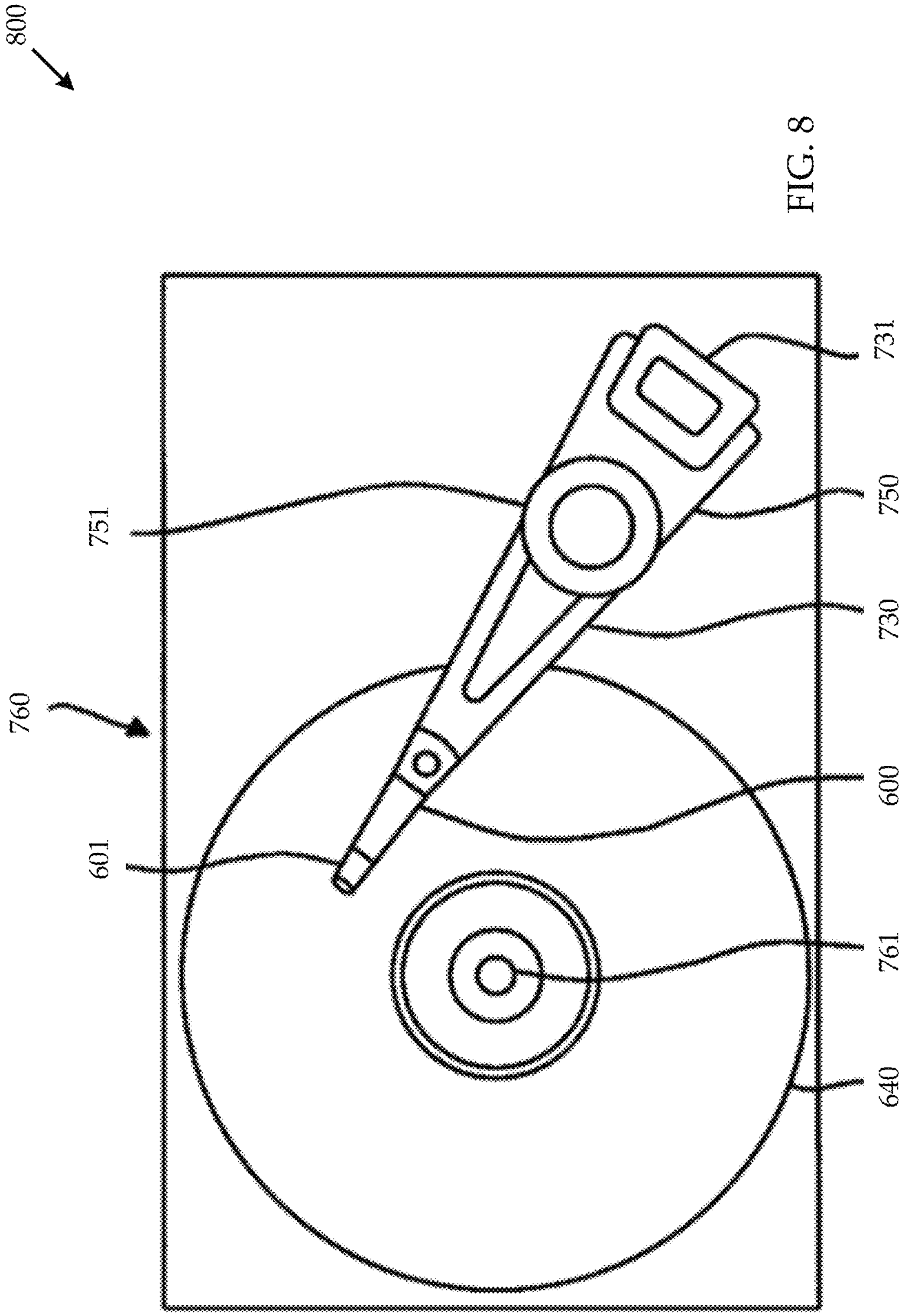
FIG. 8 is a plan view of an example magnetic recording apparatus, according to some embodiments.

With reference to FIG. 8, the head stack assembly 750 is incorporated in a magnetic recording apparatus 760. The magnetic recording apparatus has a plurality of magnetic media 640 mounted to spindle motor 761. For every magnetic recording medium, there are two magnetic recording heads arranged opposite one another across the magnetic recording medium. The head stack assembly and actuator except for the magnetic recording heads 601 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a writer element (not shown) and reproduces the information recorded in the magnetic recording media by a magnetic sensor element (not shown).

It will be understood that terms such as “top,” “bottom,” “above,” “below,” and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term “present invention” as used herein should not be construed to mean that only a single invention having a single essential element or group of elements is presented. Similarly, it will also be appreciated that the term “present invention” encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A write head comprising:

a main pole;

a trailing shield;

an assist device disposed between the main pole and the trailing shield;

an insulator layer disposed adjacent to a back edge of the assist device and a side of the main pole; and a metal material disposed adjacent to the insulator layer and the trailing shield.

2. The write head of claim 1, wherein a thickness of the insulator layer is less than a thickness of the metal material, wherein the thickness of the insulator layer ranges from 1-20 nanometers.

3. The write head of claim 1, wherein the insulator layer comprises an oxide material comprising aluminum oxide, magnesium oxide, tantalum oxide, or silicon oxide, or a nitride material including silicon nitride or aluminum nitride.

4. The write head of claim 1, further comprising:

an additional metal layer disposed between the back edge of the assist device and the insulator layer.

5. The write head of claim 4, wherein a thickness of the additional metal layer is less than a thickness of the metal material.

6. The write head of claim 4, wherein the additional metal layer and the metal material comprises any of Ruthenium (Ru), Titanium (Ti), Tantalum (Ta), or an alloy including Nickel-Chromium (NiCr), and a multilayers of one or more of Ru, Ti, Ta, and NiCr.

7. The write head of claim 1, wherein the back edge is disposed away from an air-bearing surface (ABS) of the write head.

8. The write head of claim 1, wherein the assist device is etched via an etching process to remove part of the assist device at the back edge.

9. The write head of claim 1, wherein the write head is part of a recording device in a head gimbal assembly, wherein the recording device is connected to a slider and a load beam, wherein the load beam is connected to a suspension configured to support the recording device and the slider.

10. A head gimbal assembly comprising:

a recording head including a slider and a device connected to the slider, the device including:

a main pole;

a trailing shield;

an assist device disposed between the main pole and the trailing shield;

a first metal layer disposed at a first side to a back edge of the assist device and a side of the main pole;

an insulator layer disposed adjacent to a second side of the first metal layer; and a metal material disposed adjacent to the insulator layer and the trailing shield;

a load beam connected to the recording head; and a suspension connected to the load beam and configured to support the recording head.

11. The head gimbal assembly of claim 10, wherein a thickness of the insulator layer is less than a thickness of the metal material, wherein the thickness of the insulator layer ranges from 1-20 nanometers.

12. The head gimbal assembly of claim 10, wherein the insulator layer comprises an oxide material comprising aluminum oxide, magnesium oxide, tantalum oxide, or silicon oxide, or a nitride material including silicon nitride or aluminum nitride.

13. The head gimbal assembly of claim 10, wherein a thickness of the first metal layer is less than a thickness of the metal material.

14. The head gimbal assembly of claim 10, wherein the first metal layer and the metal material comprises any of Ruthenium (Ru), Titanium (Ti), Tantalum (Ta), or an alloy including Nickel-Chromium (NiCr), and a multilayers of one or more of Ru, Ti, Ta, and NiCr.

15. The head gimbal assembly of claim 10, wherein the back edge is disposed away from an air-bearing surface (ABS) of the recording head.

16. The head gimbal assembly of claim 10, wherein the assist device is etched via an etching process to remove part of the assist device at the back edge.

17. A method for manufacturing a write head, the method comprising:

forming a main pole;

disposing an assist device in a gap formed between the main pole and the trailing shield;

disposing an insulator layer adjacent to a back end of the assist device and a side of the main pole;

disposing a metal material adjacent to the insulator layer and the trailing shield; and disposing a trailing shield adjacent to the main pole.

18. The method of claim 17, further comprising:

performing an etching process to remove a portion of the assist device at the back end of the assist device.

19. The method of claim 17, further comprising:

disposing an additional metal layer between the back end of the assist device and the insulator layer.

20. The method of claim 17, further comprising:

providing the write head in a head gimbal assembly, wherein the write head is connected to a slider and a load beam, wherein the load beam is connected to a suspension configured to support the write head and the slider.

* * * * *